United States Patent [19]

Seki

[11] Patent Number: 4,747,005

[45] Date of Patent: May 24, 1988

[54] AUTOMATIC DISC SEPARATING AND FEEDING APPARATUS FOR DISC COPYING MACHINE

[75] Inventor: Noriyuki Seki, Tokyo, Japan

[73] Assignee: Kabushiki Kaisha Graphico, Tokyo, Japan

[21] Appl. No.: 720,269

[22] Filed: Apr. 5, 1985

[30] Foreign Application Priority Data

Apr. 7, 1984 [JP] Japan ............................ 59-51287[U]

[51] Int. Cl.⁴ .................. G11B 5/012; B65H 3/08; B65G 59/00
[52] U.S. Cl. .................................. 360/98; 360/137; 360/15; 271/30.1; 271/108; 414/118
[58] Field of Search ................ 360/98, 15, 137; 271/30.1, 108, 31; 901/40; 369/194, 191, 270; 414/121, 118

[56] References Cited

U.S. PATENT DOCUMENTS

| | | | |
|---|---|---|---|
| 1,906,620 | 5/1933 | Knight et al. | 369/270 |
| 2,386,166 | 10/1945 | Lissiansky | 369/191 |
| 3,341,070 | 9/1967 | Hertrich | 360/92 |
| 3,782,716 | 1/1974 | Long et al. | 271/108 |
| 4,106,062 | 8/1978 | Foote | 360/15 |
| 4,206,465 | 6/1980 | Tamoto et al. | 414/121 |
| 4,610,444 | 9/1986 | Land et al. | 271/31 |

FOREIGN PATENT DOCUMENTS

0943359 12/1963 United Kingdom ................ 414/121

OTHER PUBLICATIONS

IBM Technical Disclosure Bulletin, vol. 29, No.4, Sep. 1986, Pick-Up Device for Robotic Use.

*Primary Examiner*—Robert S. Tupper
*Assistant Examiner*—Andrew L. Sniezek
*Attorney, Agent, or Firm*—Oblon, Fisher, Spivak, McClelland & Maier

[57] ABSTRACT

An automatic disc separating and feeding apparatus for a disc copying machine is disclosed which is capable of effectively preventing the damage to a disc and/or an envelope thereof during the operation. The apparatus includes a disc sucking and sliding device for sucking up an uppermost one of the stacked discs which includes a stationary plate and a sliding plate each provided with through-holes adapted to form together air vents varied in size depending upon the position of the sliding plate to lift the disc up by action.

3 Claims, 5 Drawing Sheets

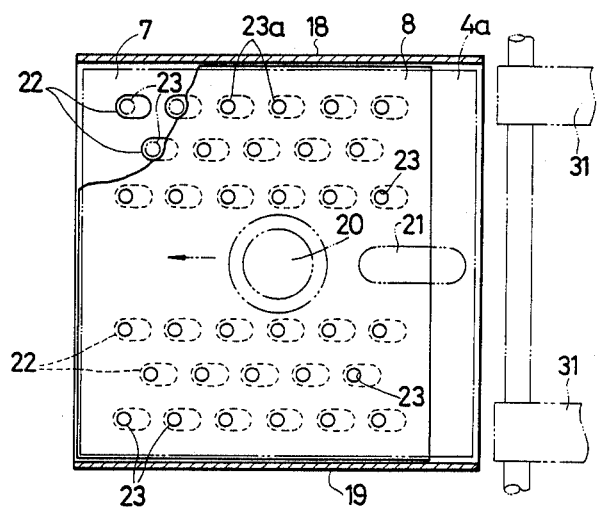
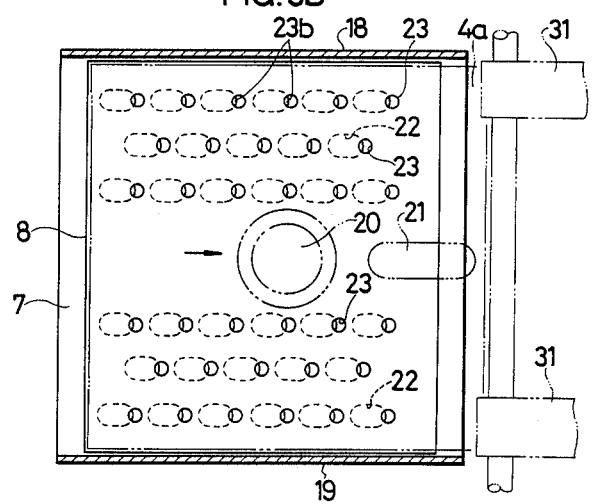

AUTOMATIC DISC SEPARATING AND FEEDING APPARATUS FOR DISC COPYING MACHINE

BACKGROUND OF THE INVENTION

1. Field of the Invention

This invention relates to an automatic magnetic disc separating and feeding apparatus for a magnetic disc copying machine, and more particularly to an apparatus for automatically separating and feeding a magnetic disc for a magnetic disc copying machine which is adapted to carry out the loading of a magnetic disc therein, the reading and writing of the disc or only the copying thereof according to a command from a computer connected thereto, and the removing of the disc therefrom.

2. Description of the Prior Art

An apparatus for feeding a magnetic disc (hereinafter referred to as "disc") for a disc copying machine is conventionally adapted to push out the lowermost one of stacked discs in order toward the copying machine. However, such action causes an envelope of the lowermost disc to be rubbed against that of a disc put thereon to frequently cause the envelope of the lowermost disc to be caught by the flap of an envelope of the upper disc, resulting in many problems occurring in the disc feeding operation.

Also, a mechanism for pushing out the disc to the copying machine is adapted to carry out the operation by inserting a pawl into a spindle hole provided at the disc or the outer edge of the envelope. This not only leads to the damage of the envelope but renders the disc unserviceable.

SUMMARY OF THE INVENTION

The present invention has been made in view of the foregoing disadvantage of the prior art.

Accordingly, it is an object of the present invention to provide an automatic disc separating and feeding apparatus for a disc copying machine which is capable of effectively preventing damage to the disc and/or an envelope thereof.

Generally speaking, an automatic disc separating and feeding apparatus for a disc copying machine according to the present invention is constructed to upwardly draw by suction the uppermost one of stacked discs to spacedly separate the uppermost disc from the stacked discs and move the disc without applying to the disc any force to cause rubbing or friction between the discs or envelopes to transfer it to a transport device such as a belt conveyor or the like.

In accordance with the present invention, there is provided an automatic disc separating and feeding apparatus for a disc copying machine comprising a receiving chamber for receiving discs therein; a supporting plate arranged in the receiving chamber to support a plurality of stacked discs thereon; a lifting device for constantly keeping uppermost one of the stacked discs at a predetermined position; a disc sucking and sliding device provided on the receiving chamber, the disc sucking and sliding device comprising a stationary plate formed with a plurality of through-holes and a sliding plate formed with a plurality of through-holes and arranged to intimately contact with the lower surface of the stationary plate; the through-holes of the stationary plate and sliding plate forming together an air vent varied in size depending upon the sliding of the sliding plate; a negative pressure chamber provided through the disc sucking and sliding device on the receiving chamber; a mechanism for reciprocating the sliding plate; and a transport device positioned opposite to the disc sucking and sliding device.

BRIEF DESCRIPTION OF THE DRAWINGS

These and other objects and many of the attendant advantages of the present invention will be readily appreciated as the same becomes better understood by reference to the following detailed description when considered in connection with the accompanying drawings in which like reference numerals designate the same parts, throughout:

FIGS. 3A and 3B each are a bottom view of a sliding plate which shows the relationship in movement between a stationary plate and the sliding plate.

DESCRIPTION OF THE PREFERRED EMBODIMENT

Now, an automatic disc separating and feeding apparatus for a disc copying machine will be described hereinafter with reference to the accompanying drawings.

Figure 1:
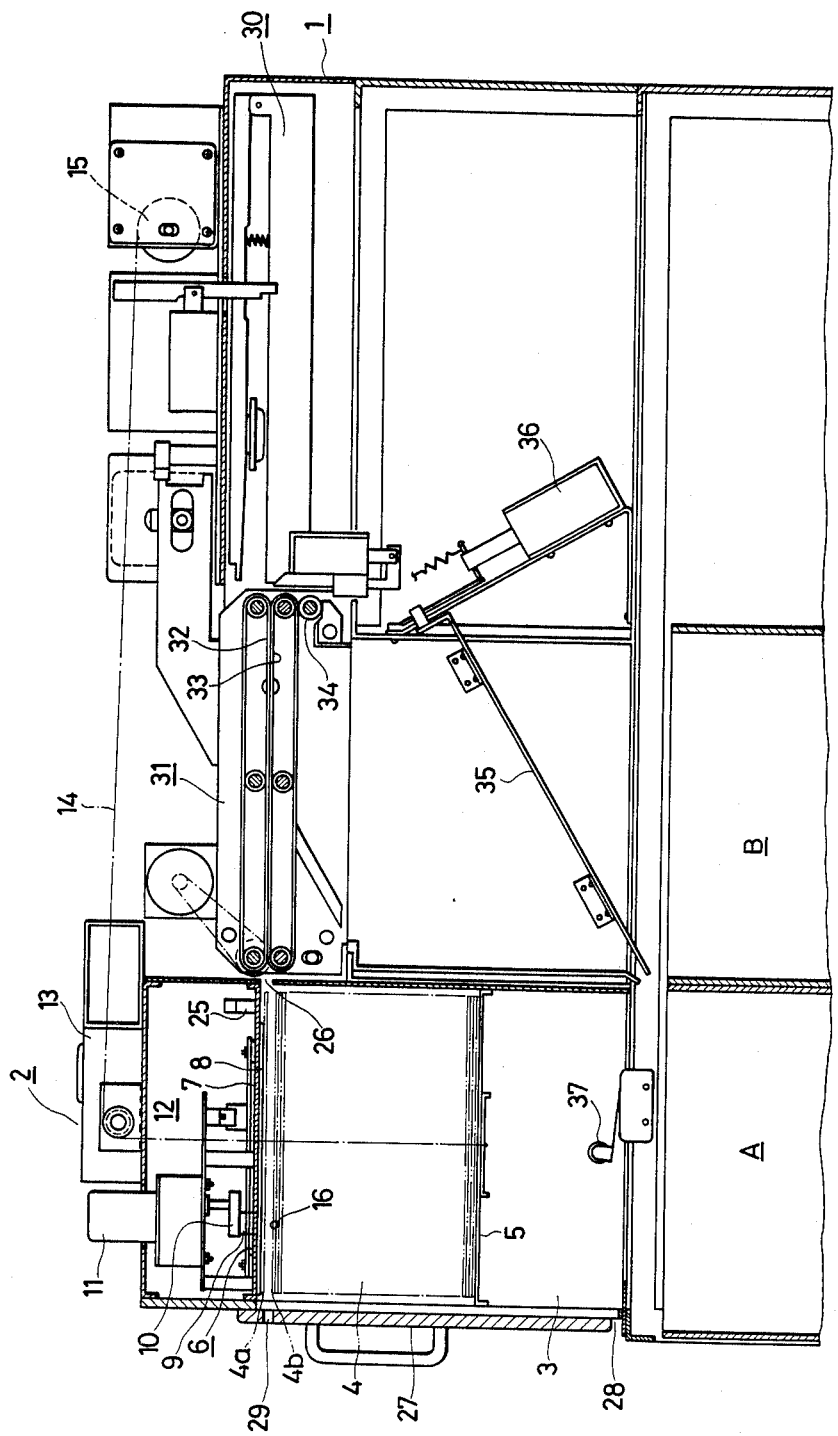
FIG. 1 is a partially vertically sectional side elevation showing an disc copying machine in which an embodiment of an automatic disc separating and feeding apparatus according to the present invention is incorporated therein.
Figure 2:
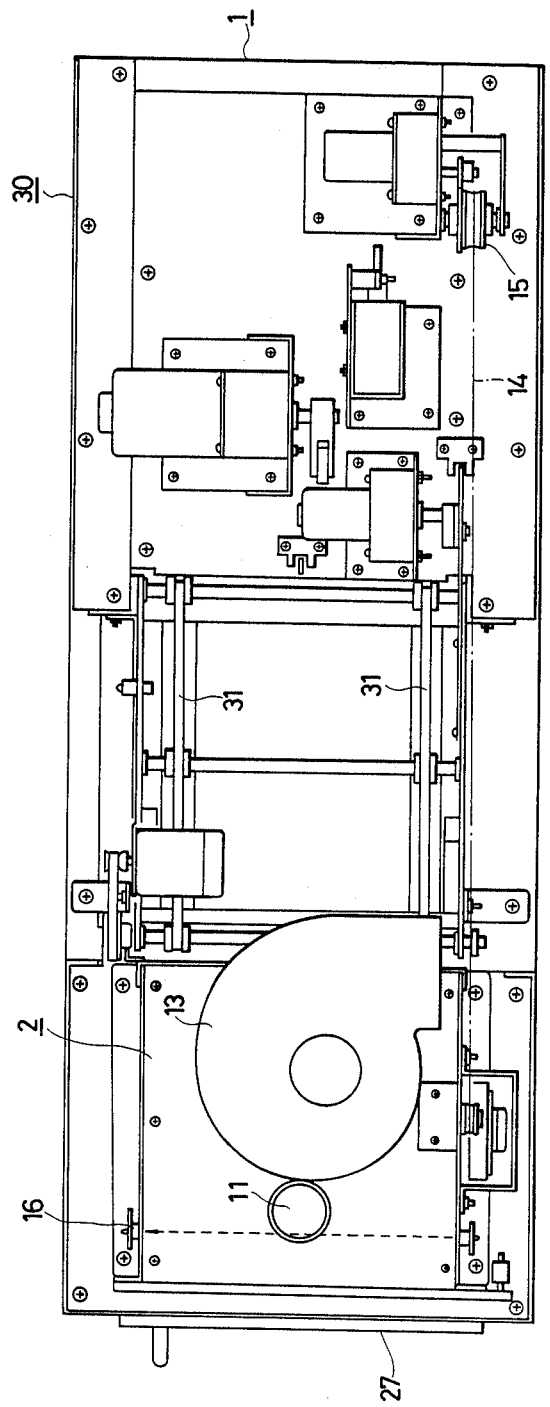
FIG. 2 is a plan view of the disc copying machine shown in FIG. 1.
Figure 4A:
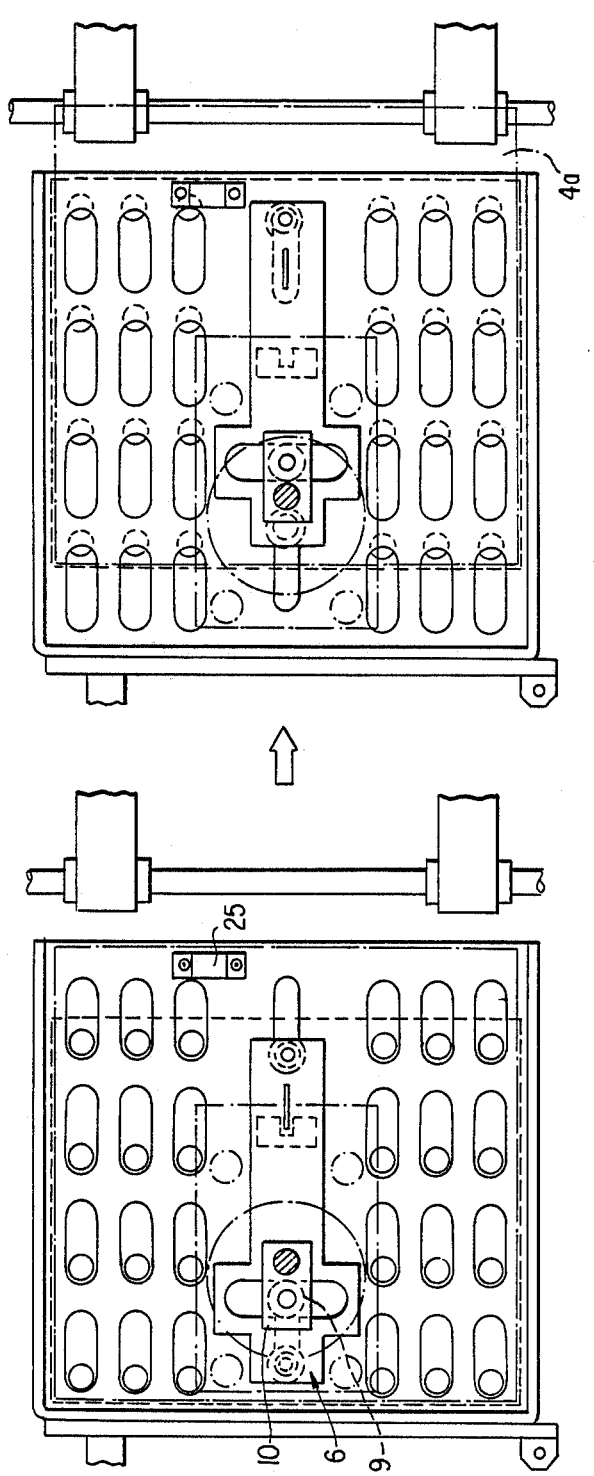
FIGS. 4A and 4B show the details and manner of operation of the sliding drive mechanism in a bottom and side view, respectively.
Figure 4B:
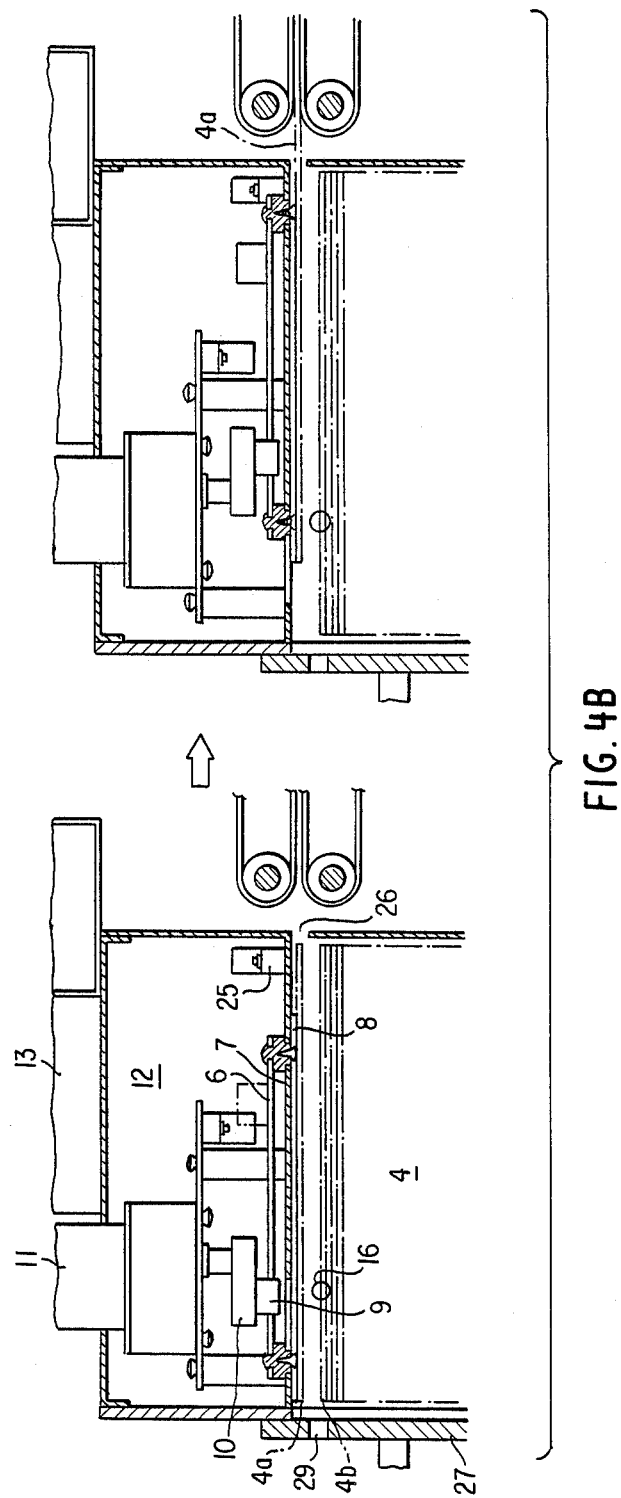

Referring to FIGS. 1 and 2, reference numeral 1 designates a disc copying machine, which includes an embodiment of an automatic disc separating and feeding apparatus according to the present invention generally designated by reference numeral 2. The apparatus 2 of the illustrated embodiment includes a disc receiving chamber 3 for receiving discs 4 therein, a lifting device having a supporting plate 5, and a device 6 for carrying out the suction and sliding of the disc 4 which comprises a perforated stationary plate 7 and a perforated sliding plate 8. The sliding plate 8 has a pin 9 fixedly embedded at the lower end thereof therein to extend through the stationary plate 7 and connected at the upper end thereof to a sliding drive mechanism 10. The apparatus 2 of the illustrated embodiment also includes a motor 11, a negative pressure chamber 12 and a blower 13 such as a sirocco fan or the like which serves to generate negative pressure in the chamber 12.

The discs 4 stacked on the supporting plate 5 are positionally controlled to allow the uppermost disc 4b to be constantly at a predetermined position. In the illustrated embodiment, the lifting device comprises a lifting wire 14 connected to the supporting plate 5, a winding device 15 for winding up the lifting wire 14 and an optical sensor 16 for carrying our the on-off control of the winding device 15. Reference numeral 37 designates a limit switch for stopping the lowering of the supporting plate 5. The lifting device is adapted to keep the uppermost disc 4b at a position right below the sliding plate 8 and spaced at a distance of about 5-8 mm therefrom, and the uppermost disc 4b is drawn by suction onto the lower surface of the sucking and sliding plate 8 in such a manner as indicated by reference 4a in FIG. 1 when the negative pressure chamber 12 is under negative pressure.

The construction of the stationary plate 7 and sliding plate 8 of the disc sucking and sliding device 6 and the relationship in movement between both plates are shown in FIGS. 3A, 3B, 4A, and 4B.

The stationary plate 7 is arranged between side walls 18 and 19 of the apparatus 2 to serve as a partition plate and is provided with a plurality of through-holes 22 at both side portions thereof between which a central hole 20 and a head hole 21 of the disc are interposed separate therefrom.

The sliding plate 8 is supported below the stationary plate 7 in a manner so as to overlap and be intimately contacted with the plate 7 and connected to the sliding drive mechanism 10. The sliding plate 8 is provided with a plurality of through-holes 23 at the portions thereof corresponding to the through-holes 23 of the stationary plate 7 in an overlapped mode and is reciprocatingly moved by the sliding drive mechanism 10.

In the disc sucking and sliding device 6 constructed as described above, when the sliding plate 7 is at a suction position or the position shown in FIG. 3A, the through-holes 22 and 23 are aligned with one another to form air vents 23a to allow a large suction force to be applied therethrough to the uppermost disc 4a to apply suction to the disc. When the sliding disc is ready for transferring the disc 4a undergoing suction, the air vents 23a are constricted as indicated by 23b so as to weaken the suction force.

In FIG. 1, reference numeral 27 designates a door plate, and 28 and 29 each indicate an air suction port.

In the illustrated embodiment, the sliding plate 8 is adapted to be slide by a rectilinear reciprocating motion mechanism such as a cam, a groove crank or the like.

The apparatus 2 further includes a sensor 25 for sensing the sucked disc. Reference numeral 26 designates a slit of 2.5–3 mm in height which is formed to have a size sufficient to pass only one disc therethrough.

Now, the manner of operation of the automatic disc separating and feeding apparatus constructed as described above will be described hereinafter.

The uppermost disc 4b placed in a suction area of the apparatus is sucked up onto the lower surface of the sliding plate 8 to be upwardly separated from the stacked discs 4, so that the uppermost disc may be smoothly separated without any harmful external force such as friction force being applied thereto, to thereby be ready for the subsequent feeding operation.

The action of the disc 4b onto the sliding plate 8 actuates the optical sensor 16 to drive the winding device 15, so that the uppermost disc 4b may be kept at a predetermined position.

Then, when any suitable discriminating device (not shown) automatically confirms that any disc is not in a disc driving device 30 and a transport and discharge device 31 is being driven, the sliding drive mechanism 10 is actuated to move the sliding plate 8 to the position shown in FIG. 3B. The discriminating device is not included in the scope of the present invention and for the sake of brevity will not discussed herein.

This causes the sucked disc 4a to be transferred through the slit 26 between belts 32 and 33 of the transport and discharge device 31 constructed in a manner known in the art. At this time, the suction force is substantially weakened to smoothly transfer the disc to the transport and discharge device 31, so that it may be automatically loaded in the disc driving device 30 to be subjected to a required treatment such as copying or the like, during which the transport and discharge device 31 carries out a seesaw motion to cause the end of the disc ejected from the driving device 30 after the treatment to be caught between the belt 33 and a discharge roller 34 and then dropped onto a distribution device 35. The distribution device is adapted to be driven through a solenoid 36 actuated on the basis of a signal fed from a computer to selectively drop the disc into one of receptacles A and B.

The automatic disc separating and feeding apparatus of the illustrated embodiment is adapted to repeatedly carry out the operation described above.

As can be seen from the foregoing, the apparatus of the present invention utilizes suction due to negative pressure to positively and safely accomplish the separation of a disc, to thereby effectively prevent the disc and/or an envelope thereof from being damaged. Also, the the apparatus of the present invention smoothly performs the automatic loading of the disc to the driving device without any harmful external force being applied to the disc, because the transfer of the disc to the transport device is carried out in a state that the suction force is automatically substantially weakened.

While a preferred embodiment of the invention has been described with a certain degree of particularity, obvious modifications and variations are possible in the light of the above teachings. It is therefore to be understood that within the scope of the appended claims, the invention may be practiced otherwise than as specifically described.

What is claimed is:

1. An automatic disc separating and feeding apparatus for a disc copying machine, comprising:
    a receiving chamber for receiving discs therein;
    a supporting plate arranged in said receiving chamber to support a plurality of stacked discs thereon;
    a lifting device connected to said supporting plate for constantly keeping an uppermost one of said stacked discs at a predetermined position;
    a disc sucking and sliding device positioned above said receiving chamber, said disc sucking and sliding device including a stationary plate formed with a plurality of through-holes and a sliding plate formed with a plurality of through-holes and arranged to overlap and be intimately in contact with a lower surface portion of said stationary plate and such that said through-holes of said stationary plate and said sliding plate selectively overlap one another so as to form air vents which allow for a variable application of suction force therethrough to said uppermost one of said stacked disc;
    said through-holes of said stationary plate and sliding plate forming together an air vent varied in size depending upon the sliding action of said sliding plate;
    a negative pressure chamber communicated with said disc sucking and sliding device on said receiving chamber;
    means connected to said sliding plate for reciprocating said sliding plate; and
    a transport device positioned adjacent said disc sucking and sliding device for receiving said uppermost stacked disc from said disc sucking and sliding device and for transporting said uppermost disc to said disc copying machine.

2. An automatic disc separating and feeding apparatus as set forth in claim 1, further comprising sensor means for sensing the presence of said uppermost disc which has been sucked up by said disc sucking and sliding device.

3. An automatic disc separating and feeding apparatus as set forth in claim 1, wherein said lifting device comprises a lifting wire connected to said supporting plate, a winding device upon which said wire is wound, and a motor mounted on said disc copying machine and connected to said winding device for winding operation thereof.

* * * * *